L. M. LYMBURNER.
CENTRIFUGAL BRAKE FOR HARNESS HANGERS.
APPLICATION FILED JAN. 14, 1915. RENEWED MAR. 21, 1917.
1,223,815.
Patented Apr. 24, 1917.
2 SHEETS—SHEET 1.
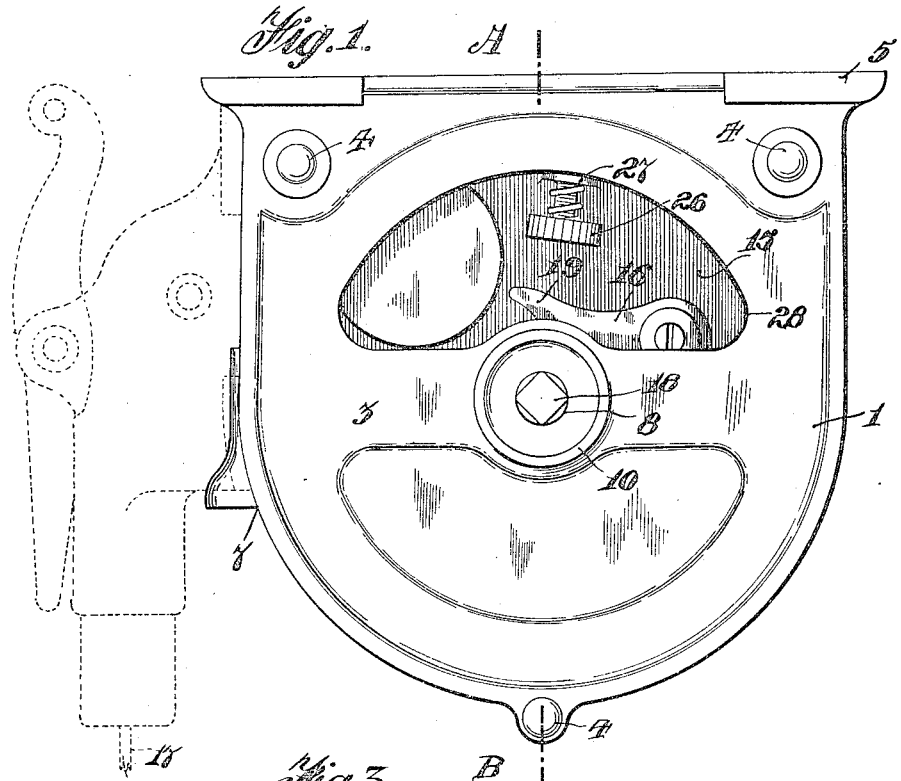
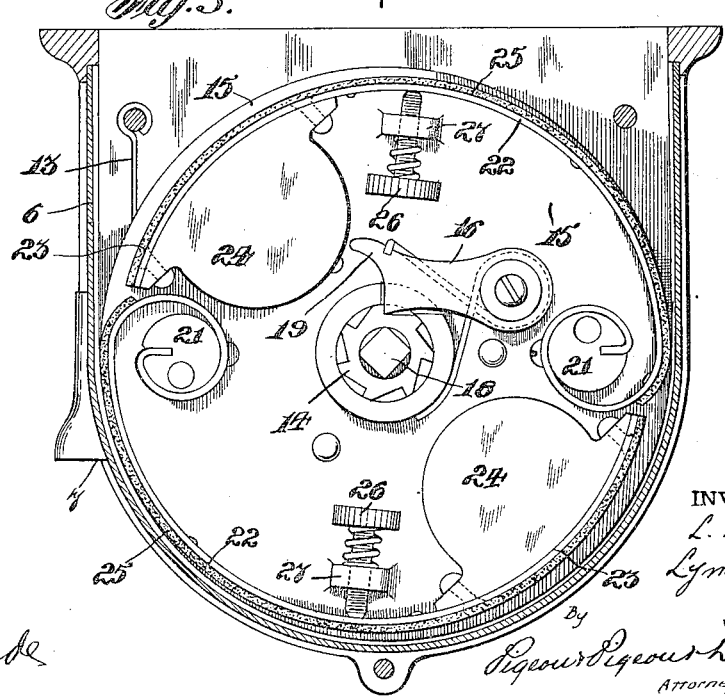
WITNESSES
C. Patenaude
M. Patenaude
INVENTOR
L. M. Lymburner
By Pigeon Pigeon Davis
Attorneys L. M. LYMBURNER.
CENTRIFUGAL BRAKE FOR HARNESS HANGERS.
APPLICATION FILED JAN. 14, 1915. RENEWED MAR. 21, 1917.
1,223,815.
Patented Apr. 24, 1917.
2 SHEETS—SHEET 2.
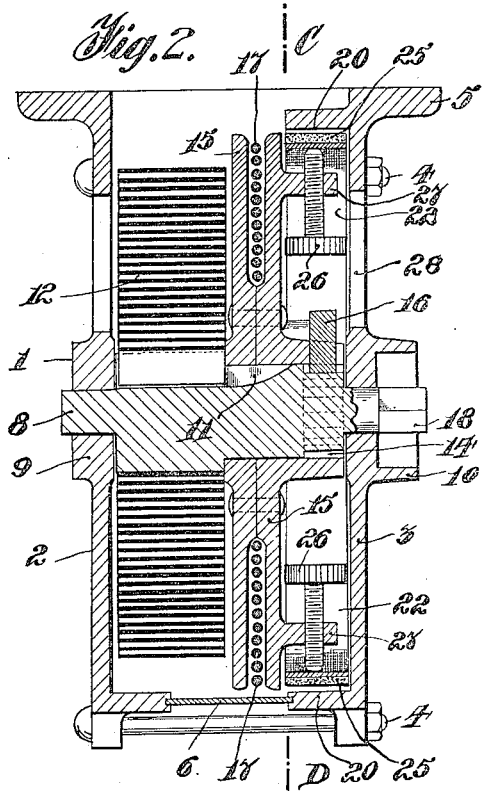

UNITED STATES PATENT OFFICE.

LOUIS MARCEL LYMBURNER, OF MONTREAL, QUEBEC, CANADA.

CENTRIFUGAL BRAKE FOR HARNESS-HANGERS.

1,223,815.  Specification of Letters Patent.  Patented Apr. 24, 1917.

Application filed January 14, 1915, Serial No. 2,199. Renewed March 21, 1917. Serial No. 156,300.

*To all whom it may concern:*

Be it known that I, LOUIS MARCEL LYMBURNER, a subject of the King of Great Britain, and residing at the city of Montreal, in the Province of Quebec, in the Dominion of Canada, have invented certain new and useful Improvements in Centrifugal Brakes for Harness-Hangers; and I do hereby declare that the following is a full, clear, and exact description of the same.

The invention relates to an improved centrifugal brake for "harness hanger" and is designed particularly for use in fire stations where the harness is suspended by a cable from the hanger attached to the ceiling, means being usually provided in the hanger for pulling the suspension bar upward out of the way when the harness has been released therefrom.
Usually, a volute spring is the means employed to wind in the cable and a great objection has been that the ceiling and sometimes the suspension bar is damaged by the recoil.
Now, it is the object of the present invention to provide brake means preferably of an adjustable nature whereby the speed of recoil is limited to a degree sufficient to prevent said damage. When door releasing means are also embodied in the hanger, it is also the purpose of the invention to provide a buffer attachment in conjunction therewith.

The invention is shown in the accompanying drawings in which Figure 1 is a side view of the hanger according to the invention with the door releasing attachment in dotted lines.

Fig. 2 is a cross section on the dotted line A—B Fig. 1.

Fig. 3 is a vertical section on the dotted line C—D Fig. 2.

Referring to the drawings, 1 is the casing of substantially D-shape formed of the two side plates 2 and 3 secured together by the bolts 4 and having the flanges 5 for attaching the device to a ceiling or beam. A filling piece 6 extends around the casing and is firmly secured between the sides 2 and 3 and provided with a cable slot 7 at one side thereof.

8 is a spindle extending across the casing 1 in the center thereof and journaled at its ends in bosses 9 and 10 in the sides 2 and 3 respectively. One end of the spindle 8 within the casing 1 is provided with a groove 11 in which the inner end of a volute spring 12 is secured, the outer end 13 of said spring being secured to one of the bolts 4 as clearly shown in Fig. 3.

The other end of the spindle 8 within the casing is provided with ratchet teeth 14 and between said ratchet teeth and the spring 12, a pulley 15 is loosely mounted on the spindle 8, said pulley carrying a pawl 16 spring pressed into engagement with the teeth 14. As thus far described, it will be seen that the cable 17 attached to and wound on the pulley 15 and extending out of the slot 7 will cause the spring 12 to be wound up when the free end of the cable containing the harness suspension bar (not shown) is pulled down. The weight of the harness carried by the suspension bar is sufficient to balance the power of the spring 12 and hold it in its wound up position, but as soon as the harness is released, the suspension bar will fly up toward the hanger owing to the unwinding of the spring and the rotation of the spindle 8 and pulley 15 caused thereby. In order to adjust the power of the spring 12, the spindle 8 is provided with a squared end 18 extending through one side of the casing and adapted to be engaged by a key through the medium of which the spring can be tightened and held in its tightened position by the engagement of the pawl 16 with the teeth 14. The pawl rides over the teeth only during this operation and is provided with a finger 19 by which it may be lifted from engagement with the teeth in case it is desired to lessen the power of the spring 12. By this means, the power of the spring 12 can be nicely regulated to counter balance any harness weight on the cable 17.

It will be seen that the lower end of the casing is of semi-circular shape and this shape is continued on the casing side 3 to form an annular flange 20 having an interior friction surface.

21 are pins secured at diametrically opposite points to the outer face of the pulley 15 within the annular flange 20, these pins forming supports for a pair of spring brake arms 22 respectively secured at one end to a pin 21 and of semi-circular shape, the free end 23 of each of said arms being provided with a weight 24 at its inner side. The outer surface of each of these brake arms is provided with a friction liner 25 adapted to contact the friction surface of the flange 20. Adjusting screws 26 threaded in ears 27 projecting from the outer face of the pulley 15 abut the inner surfaces of the spring arms 22 to limit the inward movement of said arms.

When the harness weight is released from the cable and spindle, the pulley 15 rotates by the unwinding movement of the spring 12, the arms 22 fly outward by the centrifugal action of the weights 24 and cause a frictional engagement between the surfaces 25 and the flange 20, thus applying a brake retarding the rotation of the pulley and preventing violent contact of the suspension bar with the hanger or the ceiling. The normal tendency of the spring arms 22 is to spring inward away from the flange 20, therefore the brake can be regulated by the slackening or tightening of the screws 26 to come into operation at any desired speed of rotation.

An opening 28 is provided in the side 3 of the casing through which the pawl 16 and screws 26 can be reached for adjusting purposes.

I wish it to be understood that the details of construction herein set forth and shown in the drawings are but one suitable arrangement and may be somewhat modified, if found desirable so long as the essential features are retained as set forth in the following claims for novelty.

What I claim is:—

1. A centrifugal brake of the character described, comprising a rotatable member, spring brake arms, means for fixing one end of each brake arm to said rotatable member, a weight secured to the free end of each brake arm, ears carried by said rotatable member at points near the weighted ends of said brake arms, and screws threaded through said arms and adapted to engage the inner faces of said brake arms and adjust them radially.

2. A centrifugal brake of the character described comprising, a rotatable member, pins carried by said member, spring brake arms each having one end coiled about and fixed to one of said pins, a weight secured to the free end of each brake arm, ears carried by said rotatable member at points near the weighted ends of said brake arms, and screws threaded through said ears and adapted to engage the inner faces of said brake arms to adjust the same radially.

Signed at Montreal, Quebec, Canada, this 6th day of October, 1914.

LOUIS MARCEL LYMBURNER.

Witnesses:
M. PATENAUDE,
C. PATENAUDE.

Copies of this patent may be obtained for five cents each, by addressing the "Commissioner of Patents, Washington, D. C."